United States Patent [19]

Bustos et al.

[11] 3,849,608

[45] Nov. 19, 1974

[54] TELEPHONE MOUNTING STRUCTURE

[75] Inventors: Rafael T. Bustos, Atlanta; James A. Leach, Mountain Park, both of Ga.

[73] Assignee: Leggett & Platt Incorporated, Carthage, Mo.

[22] Filed: Nov. 12, 1973

[21] Appl. No.: 414,873

[52] U.S. Cl. .............. 179/146 R, 174/48, 174/59, 179/178
[51] Int. Cl. ............................................. H04m 1/04
[58] Field of Search ........ 179/100 R, 100 C, 146 R, 179/178, 179, 186; 174/48, 52 R, 53, 54, 55, 58, 59; 339/34, 65, 66, 125

[56] References Cited
UNITED STATES PATENTS

| | | | |
|---|---|---|---|
| 1,936,245 | 11/1933 | Burke et al. | 179/100 R |
| 2,824,662 | 2/1958 | Cole | 220/18 |
| 2,878,324 | 3/1959 | Guerrero | 179/146 R |
| 2,895,634 | 7/1959 | Comroe | 220/3.4 |
| 2,942,227 | 6/1960 | Hjelseth, Jr. | 339/147 |
| 3,141,721 | 7/1964 | Horn | 339/65 |
| 3,182,805 | 5/1965 | Foster, Jr. et al. | 211/26 |
| 3,213,210 | 10/1965 | Samples | 179/189 |
| 3,299,199 | 1/1967 | Mattingly | 174/50 |
| 3,365,156 | 1/1968 | Beck | 174/58 |
| 3,393,278 | 6/1968 | Gerosa et al. | 179/100 R |
| 3,470,330 | 9/1969 | Brown | 179/146 R |
| 3,491,327 | 1/1970 | Tait et al. | 174/48 |
| 3,511,942 | 5/1970 | Quigley | 179/146 R |
| 3,513,478 | 5/1970 | Kemper et al. | 339/91 R |
| 3,598,900 | 8/1971 | Drake | 174/48 |
| 3,619,476 | 11/1971 | Rasmussen | 174/58 |
| 3,630,406 | 12/1971 | Hammes | 174/48 |
| 3,675,183 | 7/1972 | Drake | 339/123 R |
| 3,676,974 | 7/1972 | Daly | 174/48 |

*Primary Examiner*—Kathleen H. Claffy
*Assistant Examiner*—Randall P. Myers
*Attorney, Agent, or Firm*—Wood, Herron & Evans

[57] ABSTRACT

Telephone mounting structure includes a wall terminal having a wall bracket with a substantially flat and unbroken forward face and rearwardly extending flanges forming an enclosure with a wall surface. The enclosure is open at the bottom and an electrical plug or jack is disposed therein. A wall mounting plate is secured to the telephone and includes lugs for connection to the bracket. A slidable plug on the wall mounting plate is moved in a plane parallel to that of the wall surface, into the enclosure to connect the telephone to the electrical jack in the enclosure and to releasably secure the telephone to the bracket. A compression frame, having a compressible skirt surrounding the wall plate, engages the wall surface and urges the phone outwardly from the wall surface and against the bracket to perfect a secure physical connection.

51 Claims, 5 Drawing Figures

TELEPHONE MOUNTING STRUCTURE

This invention relates to telephone mounting structure and more particularly to improved apparatus for mounting telephone sets to wall surfaces and for connecting the sets to existing telephone system circuitry.

The commercial installation of telephone wall sets in both new or existing structures has for some time followed certain well-known basic steps. When a structure is built, telephone operating company personnel install wires, connected to existing system circuitry, within the structure's wall in locations where telephones are likely to be required. Upon occupancy, the telephone operating company is contacted and desired telephone sets are ordered, whereupon operating company personnel return to the structures and install the ordered sets in the specified locations. The installation usually includes cutting into a wall (if not already done) to retrieve previously located wires and establishing a terminal on the wall to which a telephone set is connected. Thus, at least two visits by company personnel to the structure are required for installation.

When the occupant vacates the structure, still another visit by company personnel is required for removing the telephone sets. In the alternative, the sets are removed by the occupant who cuts the wires, thereby leaving unsightly wall mounting structures and perhaps dangling or exposed wires and terminals. For each succeeding occupant, the installation and removal process is repeated and requires at least one visit to the structure by operating company personnel.

This briefly described situation and many of its variations has a number of inherent commercial, economical and technical disadvantages. From a commercial standpoint, the user is faced with the problem of ordering telephone sets which are unseen until delivery. Concurrently, the operating company does not normally have an opportunity to display visually its full selection of equipment. Order mix-ups and changes of mind as to color, style and the like, after viewing a previously unseen set, frequently require still further replacement visits by skilled company personnel. Additionally, succeeding occupants desiring telephone sets in different locations are faced with the aesthetic problem of an unused and obtrusive terminal, jack, wall plate or other device not hidden by a telephone set and usually not conforming to the decor of the room.

From an economical standpoint, repeated visits to installation points is very expensive and normally ties up a mobile equipment unit and at least one skilled person. It is thus highly desirable to hold such repetitive visits to a minimum if it is not possible to eliminate them altogether within the present system.

As suggested above, there are also severe technical problems associated with this situation. Wall terminals, jacks or the like normally are of the female type and include a plurality of openings into which male jacks are inserted when a set is installed. The openings generally provide access to an electrical interface which, in the absence of a cooperating plug, are relatively unprotected. This interface is thus very easily contaminated and it has been found that it is frequently contaminated by paint or wall coverings and the like applied to surrounding walls. Such contamination results in line static or in complete circuit failure.

One proposed solution to some of the above commercial and economic problems is a relatively new concept in consumer equipment marketing. The concept includes a local "telephone store" to which a consumer goes and there purchases desired telephone sets. He then takes the set home, connects it to an existing terminal and calls the store to establish a number. This, of course eliminates an installation service visit to the location by operating company personnel.

In order to facilitate wall mounting of the telephone sets and electrical connection to the system by unskilled persons, in one specific example within this new concept, the telephone set includes a rear plate having a stationary electrical male plug and one spring loaded detent. A wall terminal includes a female connector and a protruding lug above and below the connector. In use, the set is hung on the upper lug and provided into place so that the male plug is inserted into the female connector. As the pivoting is continued, the lower lug cooperates with the spring detent to releasably hold the set in place.

This system and equipment incorporates certain disadvantages, particularly in the hardware of the telephone set and the wall terminal. The terminal alone is very obtrusive and generally must be covered or removed when no telephone set is to be used therewith. In addition, between removal and installation of succeeding sets, the electrical interface is exposed and easily contaminated, for example, by paint, dirt and the like.

It has thus been a primary objective of the invention to provide improved telephone set wall mounting apparatus which protects the electrical interface from contamination and at the same time provides an unobtrusive wall terminal which can be adapted to blend into most decorative schemes without requiring removal or additional terminal covering equipment.

A further objective of the invention has been to provide an improved telephone set wall mounting terminal which has a substantially flat unbroken forward face lying in plane parallel and nearly flush with the plane of the wall.

A further objective of the invention has been to provide means for releasably securing a telephone set to a wall terminal and at the same time effecting electrical connection between the terminal and the telephone set.

A further objective of the invention has been to provide a wall telephone set with a compression frame for improving the aesthetic appearance of a mounted set and for accommodating wall surface aberrations adjacent the set.

While the invention is highly useful in providing hardware which gives commercial and technical viability to the "telephone store" concept, it is also highly useful in the present typical installations as it provides a non-contaminable, unobtrusive wall terminal which can be painted or even papered over to blend in with a selected decor. In this connection, the present invention provides substantially improved wall mounting structure over such prior devices as shown, for example, in U.S. Pat. No. 3,470,330. While the device of that patent may provide some advantage to the skilled installer, it has several disadvantages that keep it from providing a solution of the above-mentioned problems. The patent discloses a telephone "backboard" and an adapter frame fitted therearound. The telephone set of the patent must be disassembled from its base plate (to tighten the mounting screws), and the connecting wires must be individually and manually handled to connect the set. The backboard requires a plurality of forward openings and is not easily blended into normal decorative schemes when no telephone set is to be used therewith. It is apparent that the installation of the telephone set requires skilled personnel and the device is not readily susceptible to installation by a relatively unskilled consumer.

In contrast, a preferred embodiment of the present invention does solve the problems mentioned above and does not incorporate the shortcomings and disadvantages of the device of the prior patent. Briefly, the preferred embodiment includes a telephone set having a casing with a rear opening, a back plate covering the opening, and a wall mounting plate attached to the back plate, the wall mounting plate having projecting supporting lugs and a slidable electrical plug which serves to electrically connect the set with existing telephone system circuitry and to releasably connect the set to a supporting wall bracket. A terminal on a wall surface includes a wall bracket, having a flat forward face and rearwardly extending flanges which cooperate with the wall surface to form an enclosure therewith. The enclosure is open at the bottom thereof and an electrical jack, providing an electrical interface to the telephone system circuitry, is located within the enclosure in a position to protect it from contamination but to render it accessible from the opening for electrical connection with the plug on the wall mounting plate.

In use, the set is supported on the wall bracket via cooperation between the supporting lugs on the wall mounting plate and the bracket flanges. The sliding plug is them moved into the enclosure to connect the set to the existing telephone system circuitry and at the same time to engage the bracket and releasably connect the set thereto.

A compression frame comprises a plate mounted between the back plate and the wall mounting plate and includes a rearwardly extending resilient skirt portion substantially surrounding the mounting plate. When the set is connected to the wall bracket, the skirt is compressed against the surrounding wall and tends to integrate the set to the wall. It peripherally urges the set outwardly from the wall and thereby enhances the firmness of the connection of the set to the wall bracket. The skirt also accommodates aberrations or waviness in the wall surface.

The invention thus provides improved and highly unique telephone wall mounting structure, including a wall terminal and bracket which is nearly flush with the wall and which can be painted or papered over, without fear of electrical interface contamination, to blend with room decor when no telephone set is used therewith. These and other objects and advantages will become readily apparent from the following detailed description of a preferred embodiment and from the drawings in which:

Figure 5:
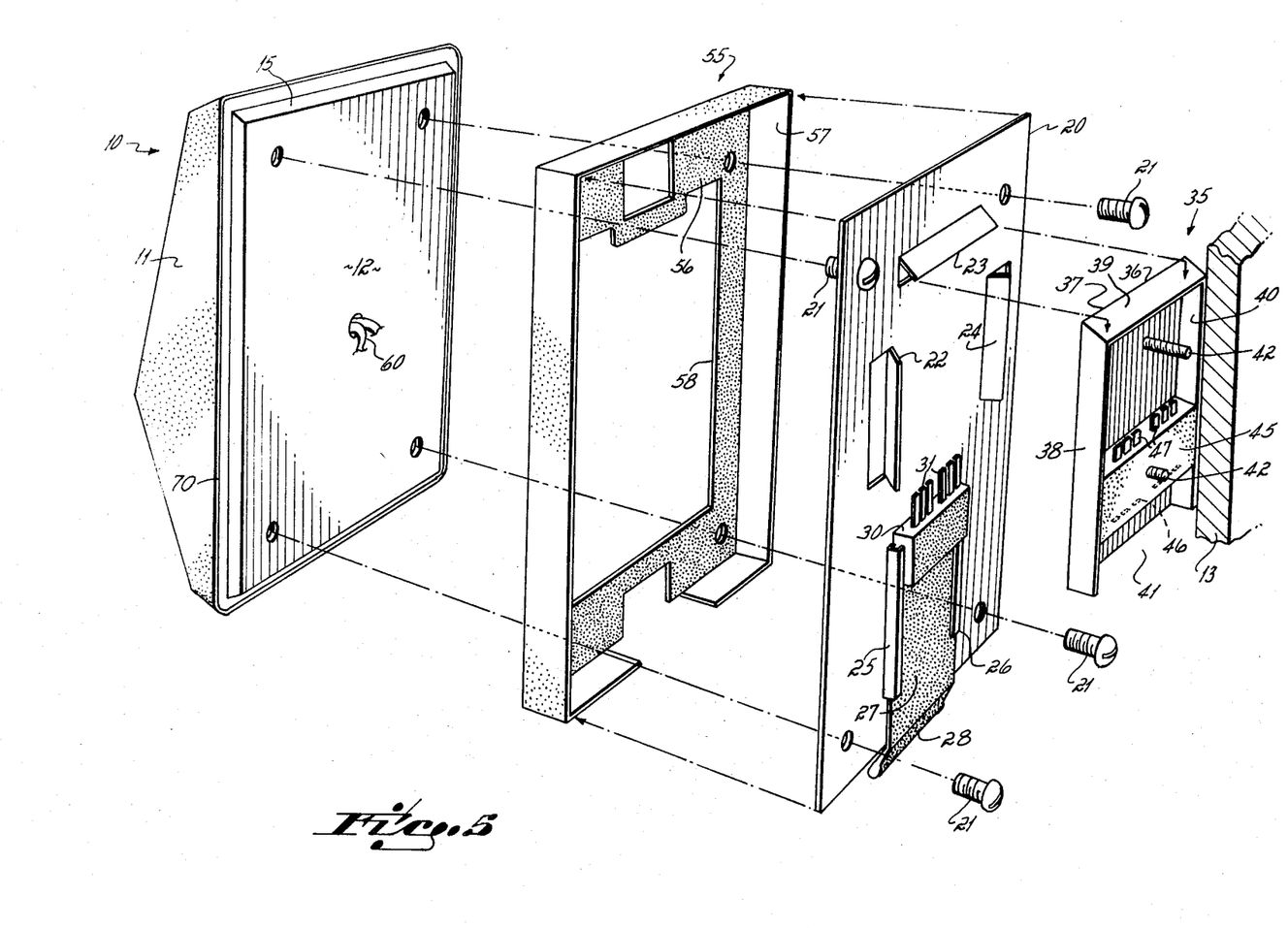
FIG. 5 is an exploded perspective view of components of the invention taken from a rearward viewpoint with respect to the telephone set.

Referring now to the drawings, FIG. 5 illustrates a rearward view of a telephone set 10 comprising a casing or housing 11 having a rear opening closed by a back plate 12. A wall surface is indicated at 13 and the various elements of the invention for connecting the telephone set 10 to the wall surface 13 are shown intermediate the set and the wall in FIG. 5.

A wall mounting plate 20 is connected via appropriate screws 21 to the back plate 12. The wall plate 20 includes projecting lugs 22–24 which are partially stamped from and bent out of the plane of the wall plate 20. As shown in FIG. 5, the projections 22 and 24 are bent so that they are angled outwardly. The flange 23, however, is bent from the plate so that its free end flares inwardly. This flange is thus acutely angled in a rearwardly and downwardly direction.

The wall plate 20 is further provided with parallel slide tracks 25 and 26 and a slide, latch or switch actuator member 27 is captured for sliding movement within the tracks 25 and 26. A male type electrical plug 30 is mounted on an upper end of the member 27 and is thus slidable with respect to the wall mounting plate 20 in a plane parallel to that of the wall mounting plate. The plug 30 includes a plurality of projecting electrical connectors 31 extending upwardly in a vertical direction substantially parallel to the plane of the mounting plate 20. The slide member 27 further includes a distal end 28 which extends outwardly of the wall mounting plate 20 and which is in a position to be manually grasped in order to move the slide 27 in the tracks 25 and 26. In addition, a spring-like detent (not shown) is provided between the mounting plate 20 and the slide member 27 in order to position the slide member in a predetermined selected position.

Figure 2:
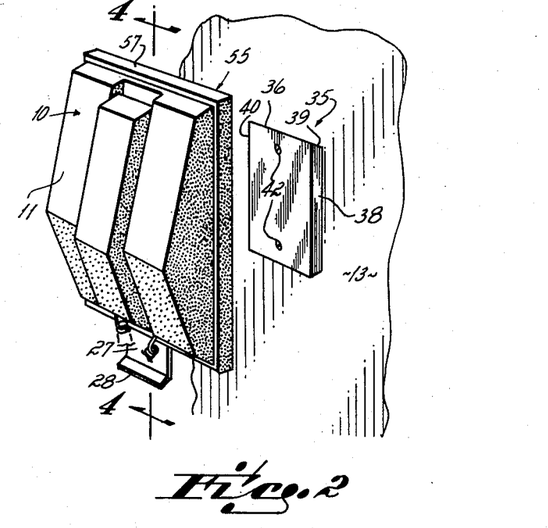
FIG. 2 is a perspective view of a telephone set similar to that of FIG. 1 but removed from and exposing a wall terminal according to the invention.

The mounting plate 20 and its various components as have been described are all constructed to cooperate with a wall terminal 35. The wall terminal 35 includes a wall bracket 36 and a female type electrical jack or connector plug 45. The wall bracket 36 has, as shown in FIG. 2, a substantially flat and unbroken forward face 37. The flat face is substantially uninterrupted, broken only by two countersunk holes for flat head mounting screws. When the screws are in place and the bracket is mounted to a wall surface, it can be appreciated that the forward face 37 is uninterrupted, by openings or the like, and thus does not have any projections, holes or other aberrations. This particularly renders its suitable for painting, covering or the like as will be discussed.

Respective flanges 38-40 extend rearwardly from the forward face 37 and, when the bracket 36 is connected to the wall surface 13, for example, by the screws 42, the wall bracket 36 forms, in conjunction with the wall surface 13, an enclosure having an opening 41 in the bottom thereof.

The top flange 39 is not perpendicular to the forward face 37 of the wall bracket but rather is bent with respect to the forward face at an acute angle as shown. The side flanges 38 and 40 are both substantially perpendicular to the forward surface 37, and all of the flanges are of such a width so that the forward surface of the wall bracket, in the preferred embodiment, is generally parallel to and extends outwardly from the plane of the wall surface a distance of approximately three-eighth of an inch. This distance, of course, can be varied and it is desired to make it as small as possible so that the plane of the forward surface of the wall bracket is as close as possible to the plane of the wall surface.

The female electrical connector 45 has a plurality of receptacles 46 (FIG. 4) projecting downwardly and accessible from the opening 41. The electrical connector 45 is not positioned at the opening 41 but rather is spaced therefrom. Each of the electrical receptacles 46 is connected through an appropriate receptacle extension 47 to a wire W, the wires W in turn being connected to the circuitry of an existing telephone system in a conventional manner.

The apparatus of the preferred embodiment further includes a compression frame 55 which has a mounting plate portion 56 and a resilient, compressible rearwardly extending skirt portion 57. In the preferred embodiment, the skirt portion 57 is made from a thermoplastic rubber compound such as synthetic moldable rubber. Alternately, the skirt portion can be made from a vinyl plastic. In either case, the material from which the skirt portion is made preferably has a durometer measurement of about 65 to 70.

The mounting plate 56 has a substantial central opening 58. Rearwardly extending resilient skirt portion 57 substantially surrounds the mounting plate portion 56 and is cut out at a bottom portion thereof so as to allow passage for the distal end 28 of the sliding member 27.

Figure 3:
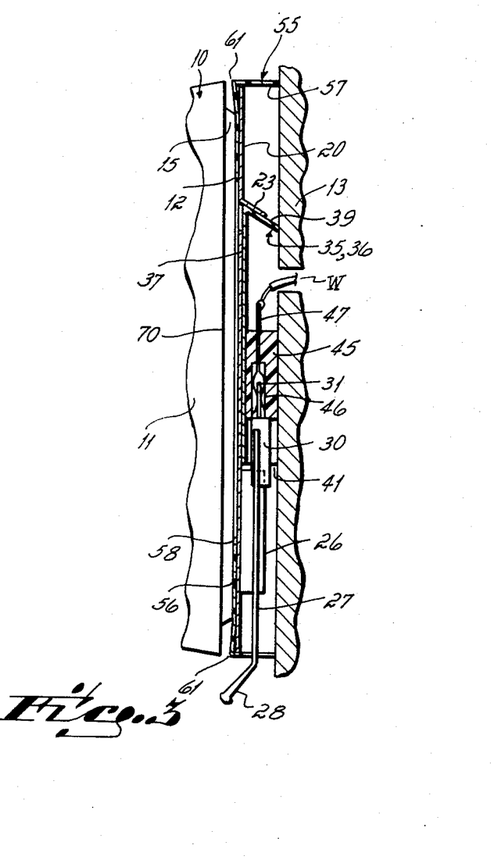
FIG. 3 is a cross-sectional view taken along the lines 3—3 of FIG. 1.
Figure 4:
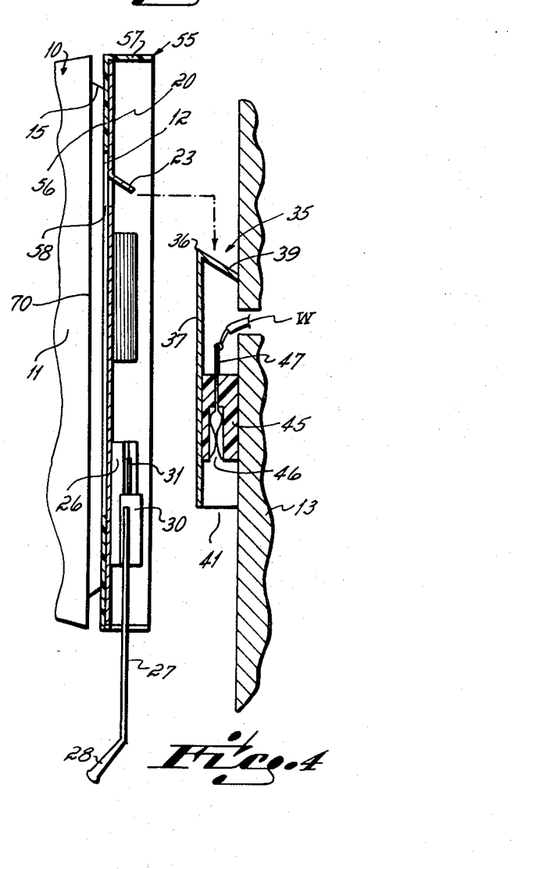
FIG. 4 is a cross-section view taken along lines 4—4 of FIG. 2.

While shown in disassembled or exploded form in FIG. 5, it will now be appreciated that the telephone set 10, the compression frame 55 and the wall mounting plate 20 are intended to be connected together to form a secure composite unit with the telephone set as best shown in the cross-sections shown in FIG. 3 and FIG 4. When assembled together, the skirt portion 57 of the compression frame extends substantially around the mounting plate 20 with the exception of the lower area of the mounting plate where the skirt is cut away in order to allow for the outward extension of the distal end 28 of the sliding member 27. When the mounting plate 20 is assembled to the telephone set 10, the electrical wires 60 (which are connected to the components of the telephone set) extending through the base plate 12 are connected to the electrical plug 30 and to the respective male projections 31. Thus, all that remains to connect the telephone set to the existing telephone system circuitry is the connection of the projections 31 to the electrical receptacles 46 of the female plug 45 within wall bracket 36.

From the drawings, it will be appreciated that the back plate 12 of the telephone set 10 includes a surrounding beveled portion 15 which serves to space the major plane of the back plate 12 from the terminal edge 70 of the telephone casing 11. Thus, when the mounting plate and compression frame are assembled to the telephone set 10, the compression bezel is, in the preferred embodiment, spaced from the terminal edge of the telephone casing as particularly shown in FIGS. 3 and 4. The spacing though between the compression frame and the terminal edge of the telephone casing will vary from phone to phone and from one installation to another.

Figure 1:
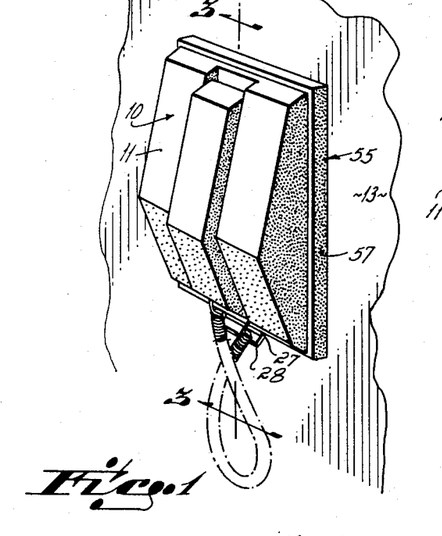
FIG. 1 is a perspective view of a telephone set mounted to a wall surface in accordance with the invention.

FIGS. 1 and 3 depict the telephone set mounted to wall surface 13. In order to mount the telephone set 10 to the wall bracket 36, the distal end 28 of the slide 27 is pulled downwardly into an unlatched position and the telephone set is hung on the bracket 36. The lug 23 of the wall mounting plate 20 is acutely angled with respect to the wall plate 20 at an angle similar to the angle that the top flange 39 makes with the forward surface 37 of the wall bracket 36. When the set is hung on the bracket, the projecting lug 23 cooperates with the flange 39 as best seen in FIG. 3 to support the telephone set on the bracket. The projecting lugs 22 and 24 of the wall mounting plate 20 serve to cam the wall mounting plate 20 into properly aligned position with respect to the wall bracket 36, the projecting lugs 22 and 24 being spaced apart a distance approximately equal to the width of the forward face 37 of the bracket 36. Once the wall mounting plate 20 is properly suspended and aligned with respect to the bracket 36, the distal end 28 of the slide member 27 is pushed upwardly into a latched position. Movement of the slide 27 and of the plug 30 and prongs 31 is in a plane generally parallel to the planes of the mounting plate, the forward surface of bracket 36 and the wall surface 31. The prongs 31 are thereby introduced into the receptacles 46 of the female jack 45 within the bracket 36.

At the same time the prongs 31 are introduced into the receptacles 46, the plug body 30 is moved upwardly into the opening 41 and engages the wall bracket 36 on a rearward portion of a forward face 37. The plug body 30 thereby prevents the outward movement of the telephone set from the wall bracket and together with the acutely angled projecting lug 23 serves to positively and securely connect the telephone set to the wall bracket. At the same time an effective electrical connection between the telephone set 10 and the existing telephone system circuitry is completed. The previously mentioned spring detent maintains the slide 27 and plug 30 in latched and connecting positions until the slide is manually moved to its unlatched position prior to removal of the set from the wall. Alternately, and in lieu of the joint function of the plug 30, an electrical connector could be connected to the telephone set circuitry and adapted for cooperation with the jack 45 while separate latching means could be used for securing the telephone set to the wall bracket.

When the set 10 is connected to the wall bracket, the compression frame serves a two-fold purpose. In the first place, it is compressed against the wall surface 13 and urges the peripheral areas of the back plate and thus the telephone set 10 away from the wall bracket 36. Thus, elements on the mounting plate (the top lug 23 and plug body 30) are urged against the bracket 36 (top flange 39 and interior portion of face 37) to provide a firm connection between the set and the wall. As can be appreciated, this "spring loading" of the connection between the set 10 and the bracket 36 greatly enhances the firmness of the connection of the set to the wall bracket. In addition, the compressible frame fills up the space which would otherwise exist between the planes of the back plate 12 and mounting plate 20 and the plane of the wall surface 13 and thereby tends to integrate the telephone set 10 with the wall surface. This enhances the appearance of the overall installation. Alternately, or in addition to the compressibility of the skirt portion 57 of the compression frame 55, the mounting plate portion 56 of the frame may also be flexible and thus may be bent slightly upon connection of the set to the wall bracket as shown at 61 in FIG. 3. In this event, the skirt portion 57 could be of a relatively non-compressible material and the flexibility of the mounting plate 56 counted upon to provide the spring loading of the skirt portion 57 against the wall surface 13.

Although not shown in the drawings, it can also be appreciated that the compressible skirt portion 57 will accommodate aberrations in the wall surface such as undulations and the like and thereby aids in avoiding unsightly gaps between the phone set and the wall surface.

The preferred embodiment thus described further provides an unobtrusive wall terminal which can be adapted to blend with most decorative schemes without fear of contamination of the electrical interface provided by the electrical receptacles 46. As shown in FIG. 2 wherein the set 10 is removed from the wall bracket 36, the bracket itself is relatively unobtrusive, providing a forward substantially unbroken and flat face extending outwardly only a very slight distance from the plane of the wall surface 13. The flat face 37 of the bracket together with the flanges 38, 39 and 40 can all be painted in order to blend with the wall surface 13. In the alternative, it is even possible to apply a wall paper or other wall covering over the bracket 36 in order to blend it into decorated wall surface. Neither indiscriminate painting nor papering will contaminate the electrical interface provided by the receptacles 46 since the plug 45 is receded within the enclosure formed by the wall bracket 36 and the wall surface 13. The receptacles are not exposed in this construction although they are readily accessible by the slidable plug 30 and its projecting prongs 31 to complete the electrical connection between the set and the existing phone system circuitry.

The preferred embodiment thereby facilitates the physical connection of a telephone set to a wall mounting position and the electrical connection of the set to existing telephone system circuitry. The set can thus be installed by unskilled persons and telephone operating company personnel are not required at the installation to install the set. The invention thus provides a tremendous economical advantage in not tying up skilled personnel and mobile service units for routine installations.

It can thus be appreciated that the invention thereby provides telephone wall mounting structure which facilitates and renders viable the "telephone store" concept mentioned above, from commercial, economical and technical standpoints.

While a preferred embodiment of the invention has been described, other alterations and modifications will become readily apparent to those of ordinary skill in the art without departing from the scope of the invention. As an example only, the plug and jack disposition might be altered such that the female jack is slidably mounted on the wall mounting plate and the male plug is mounted between the wall bracket and the wall. The number of actual prongs on the plug and their orientation can be varied and, if miniaturization is desired, multiple contacts can be provided on single prongs by the expedient of providing a composite prong comprising a laminate of two or more separate contacts spaced apart by an insulator. The applicants therefore intend to be bound only by the appended claims.

We claim:

1. Improved mounting apparatus of the type for mounting a telephone set to a wall surface and for connecting the set to established telephone system circuitry, said apparatus comprising:
   a wall bracket having a substantially flat forward face and rearwardly extending flanges on the top and two sides thereof,
   said bracket being mounted on a wall surface and forming an enclosure with respect thereto,
   said enclosure having an opening between the bottom of the forward face of said bracket and the wall surface,
   first plug means having connectors disposed within said enclosure, spaced from and accessible from said opening, said connectors being connected to said telephone system circuitry,
   a telephone set mounting plate connected to said telephone set,
   second plug means mounted on said mounting plate for movement with respect thereto and being electrically connected to said set, said second plug means for cooperating with said first plug means to electrically connect said set to said circuitry, and releasably connecting the telephone set mounting plate and the telephone set to the wall bracket.

2. Apparatus as in claim 1 further including projecting lugs on said telephone set mounting plate, said lugs adapted to respectively cooperate with said rearwardly extending flanges to support said telephone set mounting plate and said telephone set on said bracket.

3. Apparatus as in claim 2 wherein said lugs comprise portions of said mounting plate and at least an upper lug is bent outwardly thereof to lie in a respective plane parallel to the respective plane of the wall bracket top flange with which the lug cooperates.

4. Apparatus as in claim 2 wherein said second plug means is mounted on said mounting plate for movement between a latched position and an unlatched position with respect to said wall bracket such that when in its latched position, said second plug means extends into said opening between the bottom of the forward face of said bracket and the wall surface in order to positively connect said mounting plate and said telephone set to said bracket.

5. Apparatus as in claim 4 wherein said second plug means, when in said latched position, also is electrically connected to said first plug means within said enclosure.

6. Apparatus as in claim 5 wherein a plug actuator is slidably mounted on said mounting plate, said second plug means being mounted on a forward end of said plug actuator.

7. Apparatus as in claim 6 wherein said plug actuator has a distal end extending outwardly from said mounting plate to provide an external means by which the second plug member can be moved between its latched and unlatched positions.

8. Apparatus as in claim 2 wherein said flange extending rearwardly from said top of said wall bracket is disposed at an acute angle with respect to said flat forward face and wherein said lug cooperating with said acutely angled flange is disposed at a similar angle, with respect to said mounting plate, in order to restrict movement of said telephone set in a direction perpendicular to said wall surface when said set is connected to said bracket.

9. Apparatus as in claim 1 wherein said telephone set includes a casing having a rear opening and a base plate covering said opening, said mounting plate being connected to said base plate and further including a frame mounted on said telephone set between said base plate and said mounting plate, said frame including a skirt extending substantially around said mounting plate and in a direction toward said wall surface.

10. Apparatus as in claim 9 wherein said skirt is is compressible and is compressed against said wall surface when said telephone set is connected to said wall bracket.

11. Apparatus as in claim 9 wherein said frame includes a flexible member mounted between said base plate and said mounting plate, wherein said skirt extends from said flexible member and engages said wall surface when said telephone set is connected to said wall bracket, and wherein said flexible member is at least slightly flexed when said telephone set is connected to said wall bracket in order to resiliently urge said skirt against said wall surface.

12. Apparatus as in claim 1 wherein said second plug means is mounted on said telephone set mounting plate for movement in a direction parallel to the plane of said wall surface when said mounting plate is connected to said wall bracket.

13. Apparatus for mounting a telephone set to a wall surface and for electrically connecting the telephone set to telephone system circuitry said apparatus comprising;
a wall bracket forming, in conjunction with said surface, an enclosure having an opening at the bottom thereof,
first plug means within said enclosure and electrically connected to said circuitry,
a telephone mounting plate connected to said telephone set, said mounting plate having means for releasably connecting the plate and the set to said wall bracket,
said releasable connecting means including second plug means electrically connected to said telephone set and slidably mounted on said mounting plate for movement in a plane generally parallel to said wall surface and into said opening so that said second plug means is electrically connected to said first plug means and engages said wall bracket to positively secure said telephone set thereto.

14. Apparatus as in claim 13 wherein said first plug means is located within said enclosure and is spaced from said opening.

15. Apparatus as in claim 13 wherein said wall bracket has a substantially flat front face and includes flanges extending rearwardly toward said wall surface from the top and two sides of said face.

16. Apparatus as in claim 15 wherein said top flange is disposed at an acute angle from said flat front face and wherein said releasable connecting means further includes at least one projecting lug extending from said mounting plate at an angle similar to said acute angle and adapted to cooperate with said top flange to support said telephone set on said wall bracket.

17. Apparatus as in claim 13 further including a frame means having a skirt portion, said frame means being mounted between said telephone set and said wall bracket so that said skirt portion extends rearwardly, engages said wall surface when said mounting plate is connected to said wall bracket, and substantially surrounds said wall bracket.

18. Apparatus as in claim 17 wherein said skirt portion is resilient and is compressed against said wall surface.

19. Apparatus as in claim 18 wherein said frame is mounted between said telephone set and said mounting plate, said skirt portion substantially surrounding said mounting plate.

20. Improved apparatus for mounting a telephone set to a wall surface wherein the set includes a housing having a terminal edge defining a rear opening, and a backplate covering said opening, said apparatus including:
a wall bracket mounted on said wall surface,
a telephone mounting plate connected to said backplate and including means for mounting said set on said bracket, said backplate being spaced from said wall surface when said set is mounted to said wall surface, and
compression frame means for filling the space between said backplate and said wall surface, said compression frame means including a compressible skirt which is compressed against said wall surface and covers said space when said set is mounted.

21. Apparatus as in claim 20 wherein said compression frame means is mounted between said backplate and said mounting plate and wherein said skirt substantially surrounds said mounting plate.

22. Apparatus as in claim 20 wherein said compressible skirt engages said wall surface and urges said set outwardly from said wall surface and portions of said mounting plate against said bracket.

23. Apparatus as in claim 20 wherein said compressible skirt is made from a thermoplastic rubber compound such as synthetic moldable rubber.

24. Apparatus as in claim 23 wherein said compound has a durometer of about 65 to 70.

25. Apparatus as in claim 20 wherein said compressible skirt is made from vinyl plastic.

26. Apparatus as in claim 25 wherein said vinyl plastic has a durometer of about 65 to 70.

27. For use in mounting a telephone set, having electrical components therein, to a wall surface and for connecting the set to telephone system circuitry, apparatus comprising:
a wall bracket having a substantially flat uninterrupted forward face and rearwardly extending flanges on the top and two sides thereof, at least one of said flanges comprising means for mounting said telephone set,
said bracket including means for mounting said bracket on a wall surface to form an enclosure with respect thereto so that the formed enclosure has an opening between the bottom of the forward face of said bracket and the wall surface, and
plug means having connectors positioned so as to be disposed within said enclosure, spaced from the accessible from said opening, said connectors being adapted for connection to said telephone system circuitry and providing means by which said electrical components of said telephone set can be operably connected to said telephone system circuitry.

28. Apparatus as in claim 27 wherein said flange extending from said top of said forward face extends rearwardly at an acute angle with respect to said forward face.

29. Apparatus as in claim 28 wherein said flanges extending rearwardly from said two sides are perpendicular to said forward face.

30. Apparatus as in claim 29 wherein all of said flanges have terminal edges lying in a common plane parallel to said forward face.

31. Apparatus as in claim 27 wherein said wall bracket is adapted for use with a telephone set including a telephone set mounting plate comprising a portion of said telephone set, said mounting plate having second plug means mounted on said mounting plate for movement with respect thereto and being electrically connected to said set, said second plug means for cooperating with said connectors to connect said set to said system circuitry.

32. Apparatus as in claim 31 wherein said second plug means is movable to engage said bracket to connect said set to said bracket.

33. Improved mounting apparatus of the type for mounting a telephone set to a wall surface and for connecting the set to established telephone system circuitry, said apparatus comprising:
a wall bracket having a substantially flat uninterrupted forward face and rearwardly extending flanges on the top and two sides thereof,
said bracket being mounted on a wall surface and forming an enclosure with respect thereto,
said enclosure having an opening between the bottom of the forward face of said bracket and the wall surface,
first plug means having connectors disposed within said enclosure, spaced from and accessible from said opening, said connectors being connected to said telephone system circuitry,
a telephone set mounting plate connected to said telephone set,
second plug means mounted on said mounting plate for movement with respect thereto and being electrically connected to said set, said second plug means for cooperating with said first plug means to connect said set to said telephone system circuitry.

34. Apparatus as in claim 33 wherein said flange extending from said top of said forward face extends rearwardly at an acute angle with respect to said forward face.

35. Apparatus as in claim 34 wherein said mounting plate includes rearwardly extending lugs, one of said lugs being located to cooperate with said top flange when said set is mounted, said one lug extending rearwardly and downwardly from said plate at an angle approximately equal to said acute angle.

36. Apparatus as in claim 35 wherein other lugs extend rearwardly and outwardly from said plate to cooperate with said flanges extending from the sides of said forward face in order to facilitate mounting said set on said wall surface.

37. Improved mounting apparatus of the type for mounting a telephone set to a wall surface and for connecting the set to established telephone system circuitry, said apparatus comprising:
a wall bracket having a substantially flat unbroken forward face adapted to lie in a plane spaced from said wall surface,
said bracket being mounted on a wall surface and forming an enclosure with respect thereto,
said enclosure having an opening between the bottom of the forward face of said bracket and the wall surface,
first connector means disposed within said enclosure, spaced from and accessible from said opening, said connectors being connected to said telephone system circuitry,
a telephone set mounting plate connected to said telephone set,
second connector means mounted on said telephone set mounting plate and connected to said set, said second connector means for cooperating with said first connector means to connect said set to said telephone system circuitry, and
means to releasably connect the telephone set mounting plate and the telephone set to the wall bracket.

38. Apparatus as in claim 37 wherein said wall bracket includes flanges extending rearwardly from the top and sides of said forward face and further including projecting lugs on said telephone set mounting plate, said lugs adapted to respectively cooperate with said rearwardly extending flanges to support said telephone set mounting plate and said telephone set on said bracket.

39. Apparatus as in claim 38 wherein said lugs comprise portions of said mounting plate and at least an upper lug is bent outwardly thereof to lie in a respective plane parallel to the respective plane of the wall bracket top flange with which the lug cooperates.

40. Apparatus as in claim 38 wherein said second connector means extends into said opening between the bottom of the forward face of said bracket and the wall surface in order to connect said telephone set to said circuitry.

41. Apparatus as in claim 38 wherein said flange extending rearwardly from said top of said forward face is disposed at an acute angle with respect to said flat forward face and wherein said lug cooperating with said acutely angled flange is disposed at a similar angle, with respect to said mounting plate, in order to restrict movement of said telephone set in a direction perpendicular to said wall surface when said set is connected to said bracket.

42. Apparatus as in claim 37 wherein said telephone set includes a casing having a rear opening and a base plate covering said opening, said mounting plate being connected to said base plate and further including a frame mounted on said telephone set, said frame including a skirt extending substantially around said mounting plate and in a direction toward said wall surface.

43. Apparatus as in claim 37 wherein said second connector means is movable in a plane generally parallel to said wall surface.

44. A telephone set mounting plate for use in mounting and electrically connecting a telephone set to a wall bracket and telephone system circuitry respectively, said mounting plate being adapted for connection to said telephone set and including,
means for engaging said bracket and supporting said set on said wall bracket, and
plug means movably mounted on said mounting plate and electrically connectable to said telephone set, said plug means being movable with respect to said plate to cooperate with corresponding plug means of said bracket to electrically connect said set to said system circuitry.

45. A telephone set mounting plate as in claim 44 wherein said plug means is mounted on said plate to move into a position positively connecting said plate to said bracket when said plate is mounted on said bracket.

46. Apparatus as in claim 44 wherein said engaging and supporting means project from the plane of said mounting plate so as to be engagable with said wall bracket, said engaging and supporting means comprising flanges extending from said mounting plate at angles other than 90° with respect thereto.

47. Apparatus as in claim 44 wherein said plug means is mounted on an actuator member, said actuator member being mounted for movement in a direction parallel to the plane of said mounting plate.

48. Apparatus as in claim 47 wherein said actuator member is an elongated slide and is mounted in tracks for sliding movement with respect to said mounting plate.

49. Apparatus as in claim 48 wherein said plug means is mounted on one end of said slide and wherein said slide includes a distal opposite end which extends outwardly from said mounting plate.

50. Improved mounting apparatus of the type for mounting a telephone set to a wall surface and for connecting the set to established telephone system circuitry, said apparatus comprising:

a wall bracket having a substantially flat unbroken forward face adapted to lie in a plane spaced from said wall surface, said bracket being mounted on a wall surface and forming an enclosure with respect thereto, said enclosure having an opening between the bottom of the forward face of said bracket and the wall surface, first connector means disposed within said enclosure spaced from and accessible from said opening, said connectors being connected to said telephone system circuitry, second connector means connected to said set, said second connector means for cooperating with said first connector means to connect said set to said telephone system circuitry, and means to releasably connect the telephone set to the wall bracket.

51. For use in mounting a telephone set, having electrical components therein, to a wall surface and for connecting the set to telephone system circuitry, apparatus comprising:

a wall bracket having a substantially flat uninterrupted forward face and rearwardly extending flanges on the top and two sides thereof, at least one of which flanges extends rearwardly from said forward face at an acute angle with respect thereto, said bracket including means for mounting said bracket on a wall surface to form an enclosure with respect thereto so that the formed enclosure has an opening between the bottom of the forward face of said bracket and the wall surface, and plug means having connectors in a position so as to be disposed within said enclosure, spaced from and accessible from said opening, said connectors being adapted for connection to said telephone system circuitry and providing means by which said electrical components of said telephone set can be operably connected to said telephone system circuitry.

* * * * *

UNITED STATES PATENT OFFICE
CERTIFICATE OF CORRECTION

PATENT NO. : 3,849,608

DATED : November 19, 1974

INVENTOR(S) : Rafael T. Bustos and James A Leach

It is certified that error appears in the above-identified patent and that said Letters Patent are hereby corrected as shown below:

Column 9, line 9, delete "is" in the second instance

Column 10, line 60, change "the" to --and--

Signed and Sealed this twenty-second Day of July 1975

[SEAL]

Attest:

RUTH C. MASON
Attesting Officer

C. MARSHALL DANN
Commissioner of Patents and Trademarks

Disclaimer 3,849,608.—*Rafael T. Bustos*, Atlanta, and *James A. Leach*, Mountain Park, Ga. TELEPHONE MOUNTING STRUCTURE. Patent dated Nov. 19, 1974. Disclaimer filed Dec. 2, 1976, by the assignee, *Leggett & Platt, Incorporated*.

Hereby enters this disclaimer to claims 44, 45, 47 and 48 of said patent.

[*Official Gazette May 24, 1977.*]